United States Patent [19]

Weinstein

[11] Patent Number: 5,608,905

[45] Date of Patent: Mar. 4, 1997

[54] DOS AND MACINTOSH PREFORMATTED COMPUTER STORAGE MEDIA

[75] Inventor: Mark R. Weinstein, San Diego, Calif.

[73] Assignee: Software Architects, Inc., Bothell, Wash.

[21] Appl. No.: 428,885

[22] Filed: Apr. 25, 1995

[51] Int. Cl.$^6$ ............................... G11B 5/09; G06F 15/14; G06F 15/40

[52] U.S. Cl. ............................ 395/621; 395/500; 360/48

[58] Field of Search ...................................... 395/500, 700, 395/400, 600, 900; 360/48

[56] References Cited

U.S. PATENT DOCUMENTS

| | | | |
|---|---|---|---|
| 5,029,125 | 7/1991 | Sciupac | 364/900 |
| 5,121,492 | 6/1992 | Saville, III et al. | 395/500 |
| 5,214,781 | 5/1993 | Miki et al. | 395/600 |
| 5,359,725 | 9/1994 | Garcia et al. | 395/500 |
| 5,437,018 | 7/1995 | Kobayashi et al. | 395/400 |
| 5,452,454 | 9/1995 | Basu | 395/700 |
| 5,485,321 | 1/1996 | Leonhardt et al. | 360/48 |

OTHER PUBLICATIONS

Grunin, Lori, "NEC CD-ROM Drive Works with PCs, PS2s, Macs", vol. 8, No. 4, p. 38. Feb. 28 1989.

Norr, Henry, "New Utilities Ease Data Sharing Between Macs, PCs: from Dayna, Data Viz, Software Architects", MacWEEK, vol. 4, No. 40, p. 4(1) Nov. 1990.

"Poloroid's Disks Already Formatted", Computing Canada, vol. 16, No. 18, p. 79(1) Sep. 1996.

*Primary Examiner*—Wayne Amsbury
*Assistant Examiner*—Charles L. Rones
*Attorney, Agent, or Firm*—Graybeal Jackson Haley LLP

[57] ABSTRACT

An initialized (formatted) 1.44 MB floppy disk which is ready for receiving and storing files under the MACINTOSH™ operating system and the DOS operating system. Alternatively, the invention may be applied to any computer storage medium which may be written to and read by the MACINTOSH™ and DOS operating systems as if it were a disk. The storage medium is not bootable for either operating system. It contains a specially configured DOS BIOS parameter block in the first physical block, a DOS file allocation table in the second physical block, a MACINTOSH™ master directory block in the third physical block, and, by containing only zeros, an empty DOS Root Directory and an empty MACINTOSH™ Volume Bitmap in the fourth physical block.

10 Claims, 3 Drawing Sheets

1.44MB DOS AND MACINTOSH STORAGE MEDIUM

| SEQUENCE BLOCK NUMBER(S) | DESCRIPTION OF CONTENTS | |
|---|---|---|
| 1 | DOS BIOS Parameter Block (BPB) | ←26 |
| 2 | DOS File Allocation Table (FAT) | ←27 |
| 3 | Copy of File Allocation Table | ←28 |
| 3 | MacIntosh Master Directory Block (MDB) | ←29 |
| 4–10 | DOS Root Directory | ←30 |
| 4 | MacIntosh Volume Bitmap (VBM) | ←31 |
| 5 | Start of usable space for MacIntosh | ←32 |
| 11 | Start of usable space for DOS | ←33 |
| 2835–2856 | MacIntosh Extents Overflow File | ←34 |
| 2857–2878 | MacIntosh Catalog file | ←35 |
| 2879 | Backup Master Directory Block | ←36 |

1.44MB DOS STORAGE MEDIUM

| SEQUENCE BLOCK NUMBER(S) | DESCRIPTION OF CONTENTS | |
|---|---|---|
| 1 | DOS BIOS Parameter Block (BPB) | ←10 |
| 2-10 | DOS File Allocation Table (FAT) | ←11 |
| 11-19 | Copy of File Allocation Table | ←12 |
| 20-33 | DOS Root Directory | ←13 |
| 34-2880 | Available for file storage | ←14 |

FIG. 1 (Prior Art)

1.44MB MACINTOSH STORAGE MEDIUM

| SEQUENCE BLOCK NUMBER(S) | DESCRIPTION OF CONTENTS | |
|---|---|---|
| 1 | Master Boot Block #1 | ←18 |
| 2 | Master Boot Block #2 | ←19 |
| 3 | Master Directory Block (MDB) | ←20 |
| 4 | Volume Bitmap (VBM) | ←21 |
| 5-27 | Star of Extents Overflow File | ←22 |
| 26-49 | Start of Catalog file | ←23 |
| 50-2878 | Available for file storage | ←24 |
| 2879 | Backup Master Directory Block | |

FIG. 2 (Prior Art)

1.44MB DOS AND MACINTOSH STORAGE MEDIUM

| SEQUENCE BLOCK NUMBER(S) | DESCRIPTION OF CONTENTS | |
|---|---|---|
| 1 | DOS BIOS Parameter Block (BPB) | ←26 |
| 2 | DOS File Allocation Table (FAT) | ←27 |
| 3 | Copy of File Allocation Table | ←28 |
| 3 | MacIntosh Master Directory Block (MDB) | ←29 |
| 4-10 | DOS Root Directory | ←30 |
| 4 | MacIntosh Volume Bitmap (VBM) | ←31 |
| 5 | Start of usable space for MacIntosh | ←32 |
| 11 | Start of usable space for DOS | ←33 |
| 2835-2856 | MacIntosh Extents Overflow File | ←34 |
| 2857-2878 | MacIntosh Catalog file | ←35 |
| 2879 | Backup Master Directory Block | ←36 |

DOS AND MACINTOSH PREFORMATTED COMPUTER STORAGE MEDIA

FIELD OF THE INVENTION

This invention relates to a method of creating empty digital storage media which is compatible with both DOS and Apple™ Macintosh™ computer systems without the need to further initialize (format) the media.

BACKGROUND

Computer systems encode information onto storage media such as disks. Such storage media contain a fixed number of smaller units known as physical blocks or sectors. Computer systems organize groups of physical blocks into one or more "volumes". Within these volumes, information is stored within discrete units known as "files". As such, each volume, and in turn each file, consumes a discrete number of physical blocks on the disk or other storage medium.

Responsible for this organization of physical blocks into volumes and files is the operating system utilized by a computer and, specifically, the filing system used by the operating system. Each filing system may encode and represent this organization of physical blocks into volumes and files in fundamentally different ways.

IBM PC™ and compatible computers use an operating system collectively known as DOS. Versions of DOS are sold by IBM, Microsoft™, and Novell™. The behavior of the operating system, the filing system, and the methods used to store and retrieve files on a storage medium are detailed in MS-DOS™ Programmer's Reference (Microsoft™ Press, 1992).

On the other hand, the filing system used by Apple™ Macintosh™ computers encodes onto a storage medium a "hierarchical filing system" (HFS) detailed by U.S. Pat. No. 4,945,475 and described further in Inside Macintosh™: Files (Addison Wesley, 1993).

The differences between the methods of these two operating or filing systems result in physical differences in the data structures used to track critical information and the locations of these data structures on the storage medium.

A user wishing to purchase an empty storage medium such as a floppy disk may purchase it in a state which requires it to undergo a process on a computer system known as "initialization" or "formatting." This involves a process performed by the user's computer where the data structures needed by the target operating system, whether it be DOS or Macintosh™, are written to the storage medium. Once these data structures are written, the medium can then be used to store and subsequently retrieve files.

Alternatively, a user may obtain a storage medium which has already undergone this process for a specific operating system. For example, preinitialized media are currently available in either DOS or Macintosh™ format. As such, a user who wishes to obtain a preinitialized storage medium must seek out and choose the product which matches the operating system required, whether DOS or Macintosh.

There is a need for a method of creating a preinitialized storage medium which may be used to store files and directories on either DOS or Macintosh™ computers. Such a medium would not require the user to perform an initialization process. Also, such a medium could be provided to users of either DOS or Macintosh operating systems, freeing a user from the need to locate a medium specifically preinitialized for one specific operating system.

SUMMARY

The present invention is a method for initializing a storage medium which is simultaneously compatible with the DOS and Macintosh™ operating systems. This method will result in an empty storage medium (with no files or directories) which can be delivered to users of either DOS or Macintosh™ computers without distinction.

The invention is also a preinitialized medium which contains data structures making it capable of use in either Macintosh™ or DOS based computer systems. Such a medium will appear to each operating system as an empty disk without files or directories. The medium has the property that when files are stored by one operating system, the medium loses its compatibility with the other operating system. A user writing a DOS file to such a storage medium would effectively be left with a disk no longer compatible with the Macintosh operating system. Similarly, a user writing a Macintosh file to such a storage medium would effectively be left with a disk no longer compatible with the DOS operating system.

This is accomplished in the present invention by writing Macintosh and DOS data structures to a single storage medium in particular locations and writing a specifically adjusted DOS BIOS Parameter Block (BPB) to the medium. This combined data structure is modified to prevent intersections between DOS and Macintosh™ data structures that would lead to problems. A storage medium so created will appear to each operating system as empty and ready for storage and subsequent retrieval of files. Files may then be stored by a computer running either the DOS or Macintosh™ operating system.

BRIEF DESCRIPTION OF THE DRAWINGS

FIG. 1 is a representation of a prior art initialized DOS storage medium of size 1.44 megabytes.

FIG. 2 is a representation of a prior art initialized Macintosh™ storage medium of size 1.44 megabytes.

FIG. 3 is a representation of an initialized storage medium of size 1.44 megabytes which results from the present invention.

DETAILED DESCRIPTION OF THE PREFERRED EMBODIMENT

Referring to FIG. 1, the DOS BIOS Parameter Block (BPB) 10 is an essential data structure required by the DOS operating system to store and retrieve files on a DOS volume. This structure must be stored in the first physical block of a DOS volume. The BPB 10 gives the DOS operating system critical information about the size of the volume. The DOS File Allocation Table (FAT) 11 is stored beginning in the second physical block of the volume. The FAT stores a representation of the locations of every file on the medium, allowing DOS to find the blocks belonging to any file on a DOS volume. After the FAT is an optional backup FAT 12, which is usually identical to the FAT 11. The backup FAT 12 is updated automatically by DOS and can be used to recover files if the FAT 11 is damaged. Following the backup FAT 12 is the DOS root directory 13, which is responsible for storing file and directory information.

The BPB 10 must be located at the first physical block (logical block number 0). Additionally, while the actual size of the FAT 11 and the backup FAT 12 will vary depending on the size of the volume, the FAT 11 must start at the second physical block (logical block number 1).

Referring to FIG. 2, a Macintosh™ storage medium stores its Boot Blocks 18 and 19 on the first and second physical blocks of a volume. The boot blocks are responsible for allowing a computer to load the operating system software from that storage medium. The Macintosh™ Master Directory Block (MDB) 20 is an essential data structure required by the Macintosh operating system, and it is stored on the third physical block. The MDB contains critical information about the volume including its size and the number of files and directories that have been stored. After the MDB is the Macintosh™ Volume Bitmap (VBM) 21, which occupies one or more physical blocks starting at the fourth physical block (block number 3). The VBM is responsible for determining which physical blocks are being used to store files and which blocks are free for use.

Following the VBM is the Macintosh Extents Overflow File 22 and the Macintosh™ Catalog File 23. These two files contain the hierarchical filing system information used by the Macintosh to locate and organize all files and directories on a volume.

The MDB 20 must be located on the third physical block (logical block number 2) of a volume. The VBM 21 must start on the fourth physical block (logical block number 3) of a volume. The extents file 22 and the catalog file 23, however, can be moved to any physical block following the last physical block of the VBM 21. Macintosh™ boot blocks 18 and 19 contain meaningful information only when the medium contains a copy of the operating system software.

As FIG. 1 and FIG. 2 illustrate, the fixed and immovable data structures contained on typical DOS and Macintosh™ storage media intersect significantly. On the 1.44 megabyte medium in FIG. 1, the FAT takes up eighteen sectors,, nine for the first FAT 11 and nine more for the backup FAT 12. The primary DOS FAT 11 intersects with the second of the Macintosh™ boot blocks 19, the Macintosh MDB 20, and the Macintosh™ VBM 21. Furthermore, the DOS BPB 10 overlaps with the first Macintosh™ boot block 18.

Thus, storing these standard Macintosh™ and DOS data structures onto one storage medium creates a disk which will appear to the DOS computer to have a damaged DOS FAT 11, since some of the physical blocks of FAT 11 will contain information used by the Macintosh™ MDB 20 and the VBM 21, which DOS cannot meaningfully interpret. Additionally, such a medium would also appear to the Macintosh™ operating system as having a damaged Macintosh VBM 21, since this physical block is used by DOS FAT 11.

FIG. 3 illustrates a storage medium created by the preferred embodiment of the present invention. As shown by FIG. 3, the preferred embodiment contains all the necessary data structures required by the DOS and Macintosh™ operating systems. However, the present invention overcomes the conflict between the Macintosh™ MDB 29 and VBM 31 with the DOS FAT 27 by modifying the DOS BPB 26 to reduce the size of the FAT to one physical block.

Although the conflict between the first FAT 27 and the Macintosh™ MDB 29 is eliminated, an intentional conflict is created between the backup DOS FAT 28 and the Macintosh™ MDB 29, both being stored in the third physical block. Since the DOS operating system writes a backup FAT every time a file is stored to a storage medium, the Macintosh™ MDB 29 will be erased when a file is written by the DOS operating system. Thus, an empty storage medium created by the present invention will be converted into a DOS-only medium once one or more files or directories are stored using the DOS operating system.

In addition, the Macintosh™ VBM 30 and the DOS root directory 31 intersect. This does not create incompatibilities when the volume contains no files or directories. The Macintosh operating system first writes information to the volume bit map (VBM block, block number 3) when a directory or a file is created on the volume. Similarly, the DOS operating system first writes information to physical block number 3–9, the DOS root directory, when a directory or file is first written to the volume by the operating system.

The Macintosh™ Extents Overflow File 34 and the Macintosh Catalog File 35 are relocated to the end of the disk (or any block after the 10th block) to avoid conflicts with the DOS root directory.

The storage medium in FIG. 3 does not contain Macintosh™ boot blocks 19, and can therefore not be used to start up a Macintosh™ computer.

Modified DOS BIOS Parameter Block (BPB)

The relevant required contents of the DOS BIOS Parameter Block (BPB) are specified in Table 1 below.

TABLE 1

DOS BIOS PARAMETER BLOCK RECORD LAYOUT
(RELEVANT FIELDS)

| FIELD BYTE LOCATION | SIZE OF FIELD | DESCRIPTION OF FIELD |
| --- | --- | --- |
| 1–11 | 11 bytes | (Not relevant) |
| 12–13 | 2 bytes | Number of bytes in each sector |
| 14 | 1 byte | Number of sectors in each cluster |
| 15–16 | 2 bytes | Number of reserved sectors |
| 17 | 1 byte | Number of File Allocation Tables (FAT) |
| 18–19 | 2 bytes | Maximum number of files in root directory |
| 20–22 | 3 bytes | (Not relevant) |
| 23 | 2 bytes | Number of sectors in each FAT |

The DOS BPB 26 is modified by setting the value which determines the number of physical blocks required for the DOS FAT such that each copy of the FAT takes up only one physical block. Thus, the primary DOS FAT 27 is on the second physical block, while the backup DOS FAT 28 is on the third physical block.

Three of the fields in the DOS BPB 26 are specifically set to accomplish this: the number of sectors in each cluster, fourteenth byte (offset 13), the number of File Allocation Tables, seventeenth byte (offset 16), and the number of sectors in each FAT, twenty-third byte (offset 22).

The number of FATs is set to 2. This is the typical default value the DOS operating system uses.

The number of sectors in each FAT is set to 1. This value is supported by the DOS operating systems but DOS will not create a new BPB on an unformatted disk with this value.

The number of sectors in each cluster is modified such that the FAT can fit into one physical block. The standard number of bytes per sector, for both DOS and Macintosh™, is 512K. In the DOS BPB 26 at the twelfth and thirteenth bytes (offset 11), the number of bytes in each sector is set to this standard. Each block corresponds to one 512K sector. A file to be stored by the DOS operating system is recorded in the required number of blocks (sectors). However, for creating an entry in the File Allocation Table, the sectors are grouped into "clusters" and one entry is written in the File Allocation Table for each cluster. Within the invention, to reduce the required size of the File Allocation Table, the number of sectors per cluster is increased so that all of the blocks (sectors) of the storage medium can be specified with a File Allocation Table that does not exceed 512K. For example, if a volume has 1,000 physical blocks (sectors) and each cluster contains four sectors, the volume is organized into 250 clusters.

Each physical block in a DOS FAT is responsible for tracking a certain number of clusters in a DOS volume. For a 1.44 MB floppy disk, each physical block tracks 330 clusters, while on larger media each physical block tracks 256 clusters. Thus, by increasing the number of sectors in each cluster specified in the fourteenth byte (BPB offset 13) to a higher value, the storage media is divided into a smaller number of larger clusters. As a result, fewer physical blocks are required for the FAT to represent the entire volume. DOS requires that the number of sectors in each cluster be set to 1 or some greater number which is a power of 2. For example, acceptable values for DOS include 1, 2, 4, 8, 16, 32, 64, and 128. In the preferred embodiment shown in FIG. 3, the number of sectors in each cluster is set to sixteen, making the maximum number of clusters 179 for a 1.44 MB storage device. Because each file requires at least one cluster, 179 is the maximum number of files that can be stored under DOS.

As indicated in FIG. 3, a 1.44 megabyte storage medium has a total of 2,880 physical blocks. Grouping these 2,880 sectors into a maximum of about 330 clusters (which is the maximum number of clusters that would fit into one physical block of the DOS FAT 27, as described above) would require each cluster to encompass about 8.8 sectors. However, as a value of 8.8 sectors can not be stored in BPB 26, this number is rounded up to the next higher power of two, which makes it 16.

Additionally, as FIG. 3 shows, the DOS root directory 30 has been reduced to 7 physical blocks rather than the 14 shown in the prior art storage medium in FIG. 1. Each physical block assigned to the DOS root directory stores records for exactly 16 entries. These entries can describe files, directories, or volume names. In the prior art DOS storage medium in FIG. 1, 14 physical blocks are assigned to the root directory 13. Therefore, the DOS storage medium in FIG. 1 can store a maximum of 224 entries in the root directory.

In the preferred embodiment described in FIG. 3, only 7 physical blocks are assigned to the root directory, limiting the maximum number of entries to 112, which is fewer than the maximum number of files that can be stored of 179. Although this reduces the maximum number of files allowed in the root directory, an additional seven sectors are available for file storage, and this is enough to allow the storage of an additional full cluster. Of course, the full number of one-byte files, 179, can be stored with the use of one or more subdirectories. This tradeoff is specific to the preferred embodiment, and it is not necessary for the present invention.

Referring to TABLE I, the BPB encodes the maximum number of files allowed in the root directory as a two-byte integer value stored in the 18th and 19th bytes at offset 17. When a storage medium of the preferred embodiment in FIG. 3 is created, this field of BPB 26 is set to 112. Additionally, the empty root directory is created by writing 7, instead of 14, physical blocks to the medium.

Referring to FIG. 3, the extents overflow file 34 and the catalog file 35 in the preferred embodiment are located at the end of the storage medium. This prevents a conflict between the DOS root directory 30 and the extents file 34. Although the medium is initially blank, extents overflow file 34 includes some minimal information necessary for an empty extents file. This information may be misinterpreted by DOS when reading from root directory 30, the DOS machine seeing this information from extents file 34 as a filename.

Although the relocation of extents overflow file 34 and catalog 35 is part of the preferred embodiment, it is not essential to the present information. The conflict prevented here would most likely cause some user confusion, but the medium would still be usable.

TABLE 2

MACINTOSH ™ MASTER DIRECTORY BLOCK
RECORD LAYOUT (RELEVANT FIELDS)

| FIELD BYTE LOCATION | SIZE OF FIELD | DESCRIPTION OF FIELD |
|---|---|---|
| 0–129 | 130 bytes | (Not relevant) |
| 130 | 4 bytes | Size of extents overflow file |
| 134 | 2 bytes | Starting allocation block of extents file |
| 136–145 | 10 bytes | (Not relevant) |
| 146 | 4 bytes | Size of catalog file |
| 150 | 2 bytes | Starting allocation block of catalog file |

Moving the catalog file 35 and extents overflow file 34 to the end of the disk is accomplished by modifying two fields of the Macintosh™ MDB 29 in the preferred embodiment. Referring to TABLE 2, the starting allocation block of the extents file (offset 134) and the starting allocation block of the catalog file (offset 150) are modified to indicate their new position at the end of the medium. The sizes of extents overflow file 34 and catalog file 35 are the same as the prior art medium in FIG. 2.

The actual contents of the extents overflow file 34 and catalog file 35 are identical to their counterparts in the prior art medium described in FIG. 2.

IMPLEMENTATION

The storage medium is created by performing these steps, in no specific order:

(1) Storing a specifically encoded DOS BIOS Parameter Block (BPB) described above to the first physical block, (2) creating an empty DOS File Allocation Table (FAT) and writing it to the second physical block, (3) creating a Macintosh™ Master Directory Block (MDB) and writing it to the third physical block, (4) creating an empty Macintosh™ Volume Bitmap (VBM) and DOS root directory and writing it to the fourth physical block, and (5) creating an empty Macintosh™ Extents Overflow File and Macintosh™ Catalog File and writing them to some physical block following the last physical block of the VBM.

The fourth step simply involves clearing all the bits of physical block number four. An empty VBM and root directory are both represented by a sequence of bytes of value zero.

The above-described method may be used with any storage media which is accessed by both the DOS and Macintosh™ operating systems as if it were a floppy disk. For example, to access newer storage media, because the necessary drivers for accessing a floppy disk are already in place, the newer media is often treated as if it were a floppy disk. If the amount of DOS file data per cluster is increased to 32 sectors (16 KB of data), the invention is functional for storage media up to about 5 MB. However, as the number of sectors per cluster is increased, the efficiency of storage is reduced because the last portion of any file to be stored will always require a full cluster even if the number of bytes is a small fraction of a cluster.

I claim:

1. An initialized computer memory storage medium, comprising:
   (a) a readable and writable digital memory medium, organized into blocks having a sequence with a beginning and an end,
   (b) the first block containing a DOS BIOS Parameter Block in which the twenty-third byte contains a specification of the number of sectors in each FAT of one,
   (c) the second block containing a DOS File Allocation Table, wherein said storage medium can be accessed by a DOS file system, and
   (d) the third block containing a MACINTOSH™ Master Directory Block, wherein said storage medium can be accessed by a MACINTOSH™ file system.

2. The storage medium of claim 1 further comprising:
   (a) the fourteenth byte of the first block contains a specification of the number of sectors in each cluster greater than one.

3. The storage medium of claim 1 further comprising:
   (a) the fourth block contains zeros.

4. The storage medium of claim 1 further comprising:
   (a) a block after the fourth block contains a MACINTOSH™ Extents Overflow File.

5. The storage medium of claim 4 further comprising:
   (a) a block after the fourth block contains a MACINTOSH™ Catalog File.

6. A method for initializing a computer memory storage medium, comprising:
   (a) organizing the medium into blocks having a sequence with a beginning and an end,
   (b) writing to the first block a DOS BIOS Parameter Block in which the twenty-third byte contains a specification of the number of sectors in each FAT of one,
   (c) writing to the second block a DOS File Allocation Table, wherein said storage medium can be accessed by a DOS file system, and
   (d) writing to the third block a MACINTOSH™ Master Directory Block, wherein said storage medium can be accessed by a MACINTOSH™ file system.

7. The method of claim 6 further comprising:
   (a) writing to the fourteenth byte of the first block a specification of the number of sectors in each cluster greater than one.

8. The method of claim 6 further comprising:
   (a) writing zeros to the fourth block.

9. The method of claim 6 further comprising:
   (a) writing to a block after the fourth block a MACINTOSH™ Extents Overflow File.

10. The method of claim 9 further comprising:
    (a) writing to a block after the fourth block a MACINTOSH™ Catalog File.

* * * * *